Figure 1:
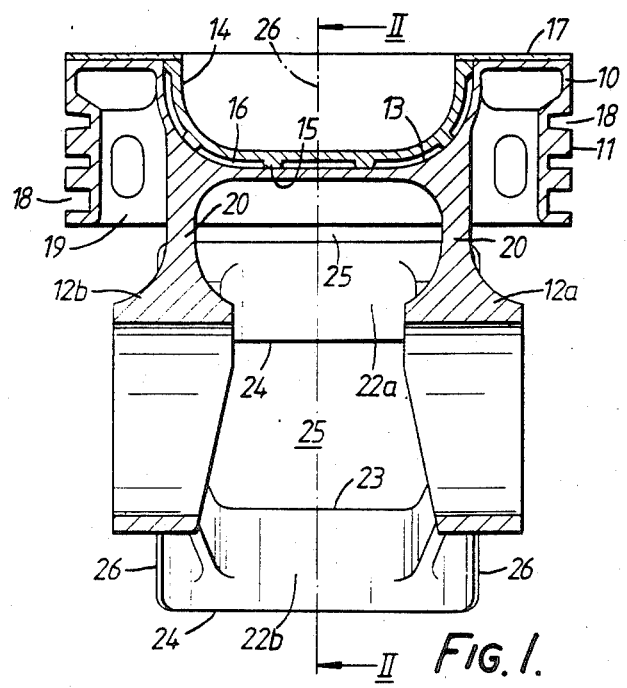

United States Patent [19]

Munro et al.

[11] Patent Number: 4,702,151
[45] Date of Patent: Oct. 27, 1987

[54] PISTONS

[75] Inventors: Robert Munro; David C. Speaight, both of Lymington, United Kingdom

[73] Assignee: AE PLC, Warwickshire, England

[21] Appl. No.: 860,318

[22] PCT Filed: Sep. 12, 1985

[86] PCT No.: PCT/GB85/00416
§ 371 Date: Apr. 30, 1986
§ 102(e) Date: Apr. 30, 1986

[87] PCT Pub. No.: WO86/01858
PCT Pub. Date: Mar. 27, 1986

[30] Foreign Application Priority Data

Sep. 14, 1984 [GB] United Kingdom ............... 8423050

[51] Int. Cl.4 .................................................. F16J 1/04
[52] U.S. Cl. .......................................... 92/237; 92/239
[58] Field of Search ....................... 92/237, 239, 224; 123/193 P

[56] References Cited

U.S. PATENT DOCUMENTS

| 2,032,849 | 3/1936 | Nelson | 92/237 X |
| 2,066,613 | 1/1937 | Day | 92/237 X |
| 3,307,456 | 3/1967 | Etienne | 92/237 X |
| 3,987,709 | 10/1976 | Day | 92/237 X |
| 4,161,165 | 7/1979 | Belush et al. | 92/237 X |

FOREIGN PATENT DOCUMENTS 0030399 6/1981 European Pat. Off. .
0050256 4/1982 European Pat. Off. .

Primary Examiner—Allen M. Ostrager
Attorney, Agent, or Firm—Leydig, Voit & Mayer

[57] ABSTRACT

A piston comprises a crown (10) and a ring band (11) carried on two gudgeon pin bosses (12a, 12b) by two supports (20). There are upper and lower pairs of struts (21a, 21b, 21c, 21d) on each side of the gudgeon pin bosses, one strut of each pair projecting from one gudgeon pin boss and the other strut of each pair projecting from the other gudgeon pin boss. Each pair carries a respective arcuate skirt portion (22) which extends only part the way round the and is symmetrical about a plane including the piston axis (28) and normal to the gudgeon pin bore axis. There are thus axially and circumferentially extending gaps (25) of constant axial width both between the upper arcuate skirt portions and the ring band between the upper arcuate skirt portions and the lower arcuate skirt portions. This provides a lightweight piston which is very conformable and can be fitted tightly in an associated cylinder or liner to reduce noise.

4 Claims, 4 Drawing Figures

PISTONS

The invention relates to a piston for an internal combustion engine comprising a crown, a piston axis, a ring band extending around the crown, gudgeon pin bosses supporting the crown and defining a gudgeon pin bore having an axis, and a skirt.

The purpose of the skirt is to transmit lateral thrust forces from the piston to an associated cylinder or liner. In many pistons, the skirt is formed by a generally cylindrical surface extending around the piston and depending from the ring band for lubricated contact with the associated cylinder or liner. Such a skirt has the disadvantage that the oil film between the skirt and the associated cylinder or liner is of substantial area and so the frictional forces generated by such film are also substantial. In addition, such a skirt is comparatively rigid and this requires the skirt to be a comparatively loose fit in the associated cylinder or liner in order to accommodate changes in piston and cylinder shape due to temperature changes, since the rigidity of the skirt does not allow the skirt to flex to accommodate such changes. Such a loose fit increases the incidence of piston slap so increasing noise.

There have been various proposals for reducing the load transmitting skirt area, to reduce the frictional forces, but some of these proposals have not provided adequate lubrication of these reduced area. In addition, others of these proposals have not dealt with the problem of the rigidity of these skirt areas.

According to a first aspect of the invention, there is provided a piston for an internal combustion engine comprising a crown, a piston axis, a ring band extending around the crown, gudgeon pin bosses supporting the crown and defining a gudgeon pin bore having an axis and a skirt characterised in that the skirt is formed by two pairs of arcuate skirt portions on opposite sides of the gudgeon pin bore, the arcuate skirt portions of each pair being connected to the gudgeon pin bosses and including at least one upper arcuate skirt portion adjacent to but spaced from the ring band by a gap, and at least one lower arcuate skirt portion spaced from said at least one upper arcuate skirt portion by an axially and circumferentially extending gap, each arcuate skirt portion being disposed about a plane including the piston axis and normal to the gudgeon pin bore axis and extending only partially around the piston.

Figure 2:
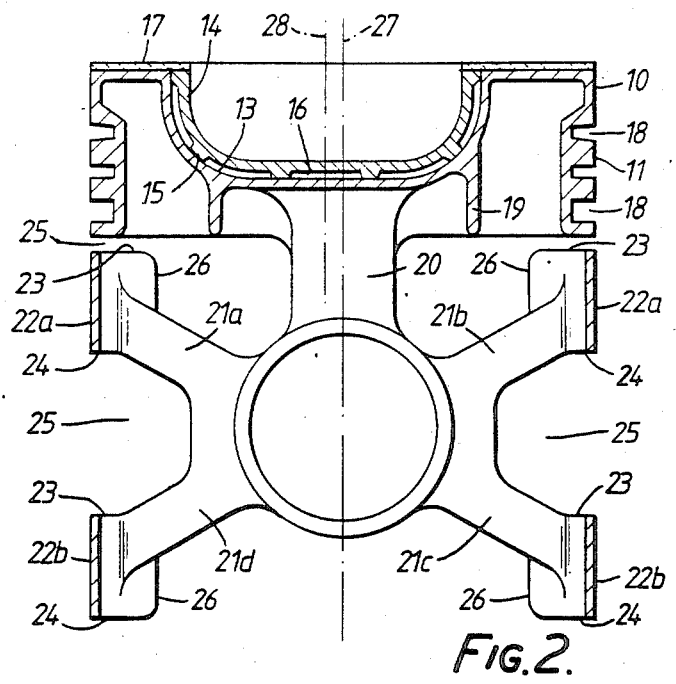
Figure 3:
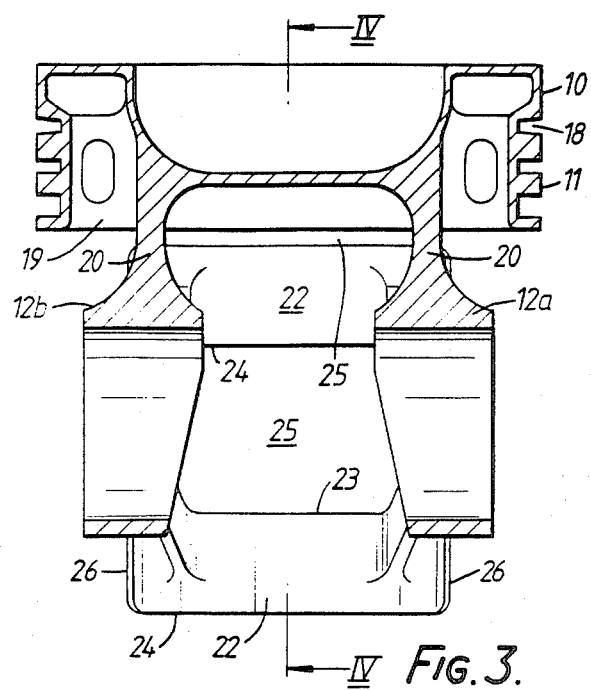
Figure 4:
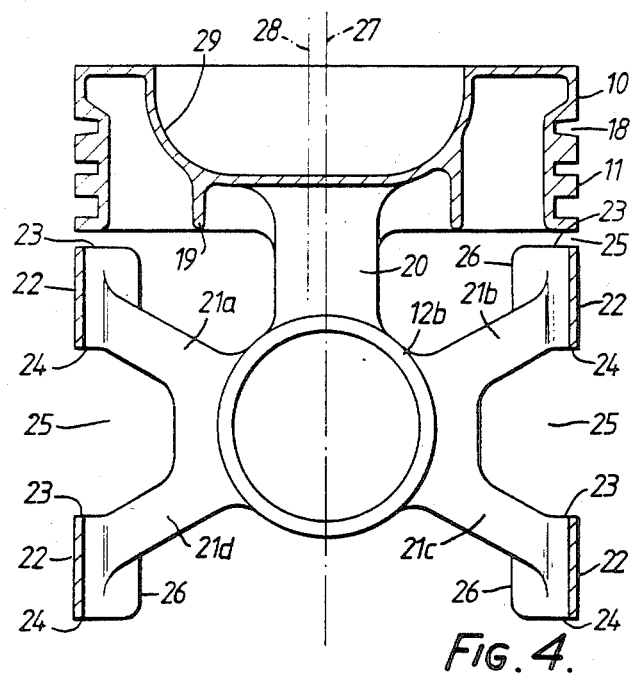

The following is a more detailed description of two embodiments of the invention, by way of example, reference being made to the accompanying drawings in which:

FIG. 1 is a section through a first form of piston for an internal combustion engine, FIG. 2 is a section on line II—II of FIG. 1, FIG. 3 is a section of a second form of piston for an internal combustion engine, and FIG. 4 is a section on the line IV—IV of FIG. 3.

Both the piston of FIGS. 1 and 2 and the piston of FIGS. 3 and 4 are made by a casting process using either an iron or a steel material, aluminium or an aluminium alloy. They are pistons for Diesel engines.

Referring now to the piston of FIGS. 1 and 2, this piston comprises a crown 10 surrounded by a ring band 11 and having two gudgeon pin bosses 12a, 12b. The crown 10 is provided with a depression 13 which receives a precision cast steel combustion bowl 14 having on its undersurface projections 15 which space the bowl 14 from the depression 13 and so form an insulating air gap 16 therebetween. The combustion bowl 14 is a shrink-fit in the depression. The crown 10 also has an annular outer surface which is spray-coated with a suitable ceramic 17 to a depth of 2 mm in order to provide a heat-resistant coating on the crown 10.

The ring band 1 depends from the crown 10 and is formed with a plurality of piston ring grooves 18. Webs 19 are provided between the crown 10 and the ring band 11 in order to provide a ring band with the required rigidity.

A support 20 extends upwardly from each gudgeon pin boss 12a, 12b and is connected to the undersurface of the depression 13 in order to support the crown 10 and the ring band 11 on the gudgeon pin bosses 12a, 12b. Each gudgeon pin boss 12a, 12b is also formed with four struts 21a, 21b, 21c, 21d. Two of these struts 21a, 21b extend upwardly and outwardly from the associated gudgeon pin boss 12a, 12b on opposite sides thereof (see FIG. 2). The other two struts 21c, 21d extend downwardly and outwardly from the associated boss 12a, 12b on opposite sides thereof (see also FIG. 2). Thus, on each side of the gudgeon pin bosses, there are, considering both bosses, a pair of upwardly and outwardly directed struts 21a or 21b and a pair of downwardly and outwardly directed struts 21a or 21c.

Each pair of struts 21 carries an associated arcuate skirt portion 22. Each arcuate skirt portion 22 has circumferentially extending upper and lower edges 23, 24 which lie in respective planes normal to the piston axis 26. These circumferential edges 23, 24 are interconnected by side edges 26 which lie in respective planes including a piston axis so that each arcuate skirt portion 22 is the shape of a segment of a cylinder. Each arcuate skirt portion 22 is symmetrically disposed about a plane including the piston axis and normal to the gudgeon pin bore axis (the plane of the section of FIG. 2) and is of limited arcuate extent. This extent may be between 70° and 110° but is preferably 80°.

There is thus an axially and circumferentially extending gap 25 both between the upper edges 23 of the upper arcuate skirt portions 22 and between the lower edges 24 of the upper arcuate skirt portions 22a and the upper edges of the lower arcuate skirt portions 22b. The axial width of each gap 25 is constant.

As shown in FIG. 2, the axis 28 of the depression 13 and the combustion bowl 14 are symmetrical about an axis 28 which is offset from a vertical plane including the gudgeon pin bore axis 27. This is to provide a correct positioning of the combustion bowl 14 in relation to a fuel injector of the associated Diesel engine.

In use, the piston of FIGS. 1 and 2 reciprocates in a cylinder of an internal combustion engine, mounted on a connecting rod by a gudgeon pin extending through the gudgeon pin bosses 12a, 12b. The limited arcuate extent of the arcuate skirt portions 22 and their spaced support on the associated struts 21 allow the arcuate skirt portions 22 readily to adapt to the cross-sectional shape of an associated cylinder or liner. In addition, since the arcuate skirt portions 22 are connected to the gudgeon pin bosses 12a, 12b and are not connected directly to the crown 10, the temperature of these parts is much reduced in comparison with pistons where the skirt is connected directly to the crown.

The piston is light in weight because the traditional full cylindrical skirt is dispensed with. Due to its conformability, the piston can be fitted more closely within an associated cylinder or liner than conventional fullskirted pistons and this tends to reduce the noisiness of the engine. Although the arcuate skirt portions provide a reduced area of contact between the piston and the associated cylinder or liner, in comparison with a piston having a cylindrical skirt, it has been found that these arcuate skirt portions are adequately lubricated at all times and that there is no mixed or boundary lubrication. This is due partly to the provision of wide gaps 25 which allow oil, thrown-up from the sump of the associated engine, to pass onto the cylinder liner wall. In this regard, the circumferential edges of the arcuate skirt portions may be provided with hydrodynamic ramps having a ramp angle of no more than 2°. These, in co-operation with the associated cylinder or liner, provided a hydrodynamic wedge action which forces oil on the cylinder or liner over the bearing surfaces of the acruate skirt portions and thus ensures hydrodynamic lubrication under all conditions.

Referring next to FIGS. 3 and 4, parts common to Figures 1 and 2 and to FIGS. 3 and 4 will be given the same reference numerals and will not be described in detail. In this embodiment, the crown 10 is not insulated by any ceramic material and the combustion bowl 29 is formed directly in the crown surface. In use, this piston operates in substantially the same way as the piston of FIGS. 1 and 2.

What is claimed is:

1. A piston for an internal combustion engine comprising:
    a crown defining a piston axis,
    a ring band extending around the crown,
    gudgeon pin bosses supporting the crown and defining a gudgeon pin bore having an axis,
    two pairs of arcuate skirt portions on opposite sides of the gudgeon pin bore,
    an upper arcuate skirt portion included in each pair of arcuate portions and adjacent to but spaced from the ring band by means defining a gap,
    a lower arcuate skirt portion included in each pair of skirt portions and spaced from the associated upper arcuate skirt portion by means defining an axially and circumferentially extending gap,
    each arcuate skirt portion being conformable and being disposed about a plane including the piston axis and normal to the gudgeon pin bore axis, extending only partially around the piston and having circumferentially extending edges spaced by side edges,
    four struts projecting from each boss, two of said four struts extending upwardly and outwardly of, and on opposite sides of the associated gudgeon pin boss and being connected to respective upper arcuate skirt portions, the two remaining of said four struts extending downwardly and outwardly of, and from opposite sides of, the associated gudgeon pin boss and being connected to respective lower arcuate skirt portions,
    each upper arcuate skirt portion being carried by two upwardly and outwardly extending struts and each lower arcuate skirt portion being carried by two downwardly and outwardly extending struts, whereby the skirt portions conform to the cross-sectional shape of an associated cylinder.

2. A piston according to claim 1, wherein each arcuate skirt portion has an angular extent of between 70° and 110°.

3. A piston according to claim 1, wherein the crown and the ring band are supported on the gudgeon pin bosses by at least two supports extending upwardly from the gudgeon pin bosses.

4. A piston according to claim 1, wherein the crown includes a combustion bowl which is symmetrical about an axis which is offset from a vertical plane including the gudgeon pin bore axis.

* * * * *